United States Patent
Paquin

(10) Patent No.: US 9,429,257 B2
(45) Date of Patent: Aug. 30, 2016

(54) TANGLE-PREVENTION SLEEVE FOR HEADPHONE/EARPHONE WIRE

(71) Applicant: Priscilla Sue Paquin, Woodstock, GA (US)

(72) Inventor: Priscilla Sue Paquin, Woodstock, GA (US)

(73) Assignee: ABBA DADDY LLC, Woodstock, GA (US)

( * ) Notice: Subject to any disclaimer, the term of this patent is extended or adjusted under 35 U.S.C. 154(b) by 3 days.

(21) Appl. No.: 13/915,198

(22) Filed: Jun. 11, 2013

(65) Prior Publication Data

US 2013/0341062 A1 Dec. 26, 2013

Related U.S. Application Data

(60) Provisional application No. 61/657,959, filed on Jun. 11, 2012.

(51) Int. Cl.
*F16L 11/00* (2006.01)
*H04R 1/10* (2006.01)
*H02G 1/00* (2006.01)

(52) U.S. Cl.
CPC ............... *F16L 11/00* (2013.01); *H02G 1/00* (2013.01); *H04R 1/1033* (2013.01); *Y10T 29/49227* (2015.01)

(58) Field of Classification Search
CPC .................................. H02G 1/08; H02G 1/00
See application file for complete search history.

(56) References Cited

U.S. PATENT DOCUMENTS

| | | | | |
|---|---|---|---|---|
| 4,296,157 A * | 10/1981 | Conti | ................ | H02G 1/08 138/121 |
| 4,302,917 A * | 12/1981 | Fermvik et al. | ............. | 52/220.8 |
| 4,440,425 A * | 4/1984 | Pate et al. | ................. | 285/149.1 |
| 4,593,442 A * | 6/1986 | Wright et al. | ................. | 29/235 |
| 5,168,128 A * | 12/1992 | Thomsen | ............... | H02G 11/00 174/135 |
| 5,360,291 A * | 11/1994 | Shimizu | ................ | 405/183.5 |
| 5,439,388 A * | 8/1995 | Weiss et al. | ................. | 439/417 |
| 5,645,268 A * | 7/1997 | Konno | ................ | 254/134.4 |
| 5,673,468 A * | 10/1997 | Pumpe | ................ | 29/33 E |
| 6,011,219 A * | 1/2000 | Casmero | ................ | 174/40 R |
| 6,158,095 A * | 12/2000 | Lassiter | ................ | F16L 3/237 24/129 R |
| 6,185,859 B1 * | 2/2001 | Pirkle | ................ | A01K 85/00 138/178 |
| 6,527,478 B2 * | 3/2003 | Finzel et al. | ............. | 405/184.4 |
| 7,230,181 B2 * | 6/2007 | Simmons | ............... | B65H 75/36 174/138 G |
| 2003/0015628 A1 * | 1/2003 | Rivera | ................ | F16L 3/08 248/74.3 |
| 2003/0112586 A1 * | 6/2003 | Horner | ................ | 361/679 |
| 2003/0173555 A1 * | 9/2003 | Supkis | ................ | B65H 57/12 254/134.3 R |

(Continued)

FOREIGN PATENT DOCUMENTS

GB 2377089 * 12/2002 ............... F16L 7/00

*Primary Examiner* — Jeremy C Norris
*Assistant Examiner* — Muhammed Azam
(74) *Attorney, Agent, or Firm* — Gardner Groff Greenwald & Villanueva, PC

(57) ABSTRACT

A method for protecting a length of flexible audio wire. The method includes providing at least one elongated hollow tube with a core and a resiliently-separable slit that provides access to the tube core. The tube is axially-flexible. The method also includes receiving the length of flexible audio wire within the hollow tube core through the resiliently-separable slit.

13 Claims, 4 Drawing Sheets

(56) References Cited

U.S. PATENT DOCUMENTS

| | | | | |
|---|---|---|---|---|
| 2005/0072884 A1* | 4/2005 | Rivera | ............... | F16L 3/08 248/74.3 |
| 2006/0172584 A1* | 8/2006 | Hidalgo | ............... | 439/369 |
| 2007/0295947 A1* | 12/2007 | Katoh | ............... | 254/134.3 R |
| 2008/0121407 A1* | 5/2008 | Kassab | ............... | H02G 3/0481 174/68.3 |
| 2008/0264669 A1* | 10/2008 | Bedingfield | ............... | G02G 6/4459 174/97 |
| 2009/0250245 A1* | 10/2009 | Kwak | ............... | H01R 13/72 174/135 |
| 2009/0301754 A1* | 12/2009 | Morley-Smith et al. | . | 174/113 R |
| 2009/0303667 A1* | 12/2009 | Scifo et al. | ............... | 361/679.01 |
| 2010/0159741 A1* | 6/2010 | Rothbaum | ............... | F16G 11/00 439/501 |
| 2011/0110552 A1* | 5/2011 | Pang | ............... | H04R 1/1033 381/374 |
| 2011/0236614 A1* | 9/2011 | Ushikai | ............... | B60R 16/0207 428/36.1 |
| 2012/0121120 A1* | 5/2012 | Gorzelany | ............... | H02G 3/04 381/384 |
| 2013/0305495 A1* | 11/2013 | Umemoto | ............... | H04R 1/1033 24/303 |
| 2013/0336515 A1* | 12/2013 | Centrilla, III | ............... | H04R 1/1033 381/384 |
| 2014/0060879 A1* | 3/2014 | Weber | ............... | B65H 75/36 174/68.3 |
| 2014/0069904 A1* | 3/2014 | Sammons | ............... | H01R 13/502 219/136 |
| 2014/0169611 A1* | 6/2014 | Minarik | ............... | H04R 1/1033 381/384 |
| 2015/0041173 A1* | 2/2015 | Chin | ............... | B65H 75/362 174/69 |
| 2015/0067988 A1* | 3/2015 | Demier | ............... | H04R 1/1033 24/122.3 |
| 2015/0110332 A1* | 4/2015 | Case | ............... | H04R 1/1033 381/384 |
| 2015/0189420 A1* | 7/2015 | Demier | ............... | H04R 1/1033 24/122.3 |

* cited by examiner

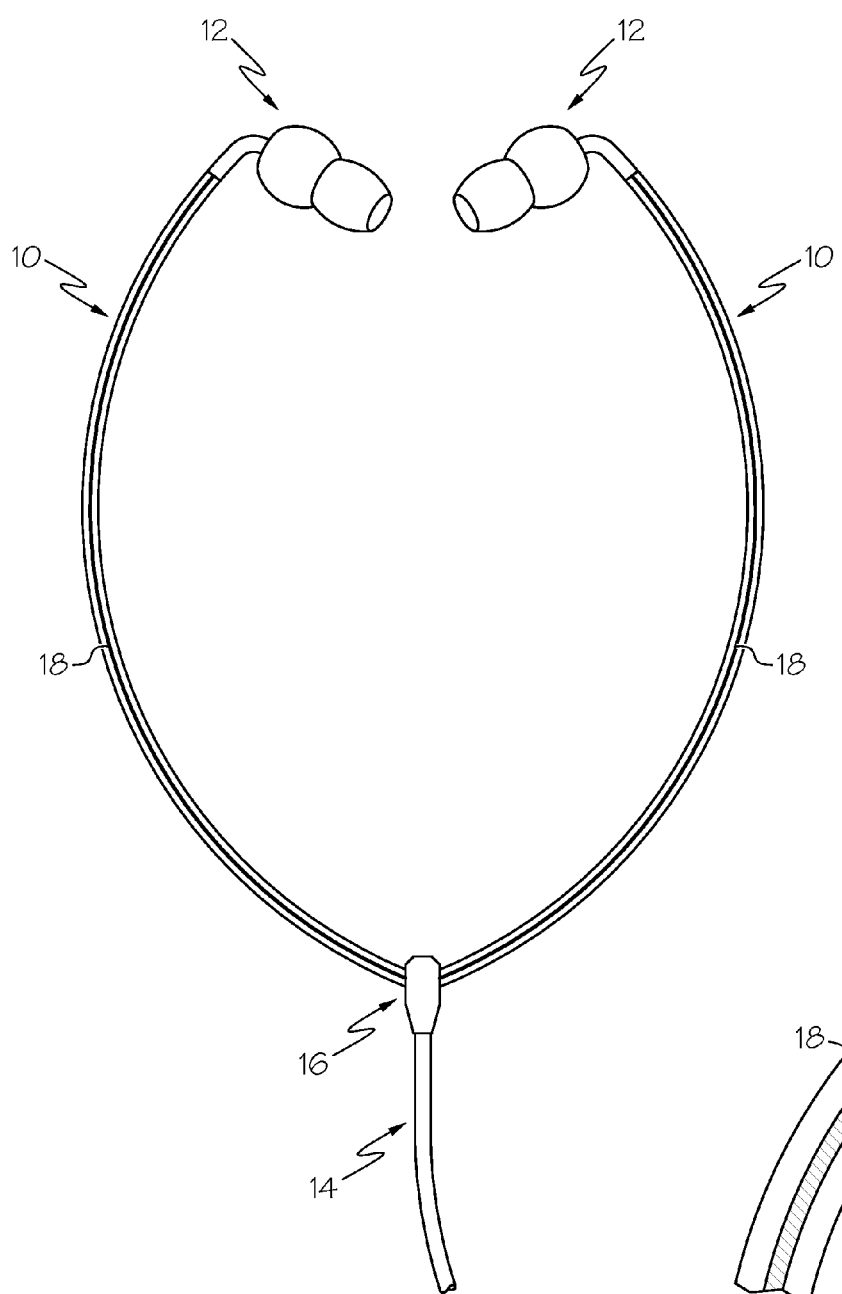
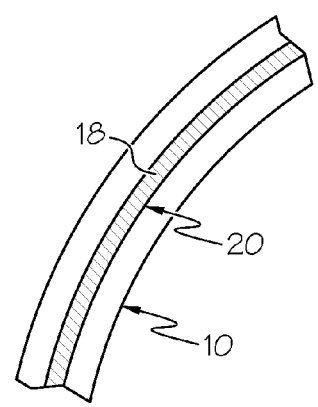
FIG. 1
FIG. 2

TANGLE-PREVENTION SLEEVE FOR HEADPHONE/EARPHONE WIRE

CROSS-REFERENCE TO RELATED APPLICATION

This application claims the priority benefit of U.S. Provisional Patent Application 61/657,959 filed on Jun. 11, 2012.

TECHNICAL FIELD

The present invention relates generally to electrical cord organizers and, in particular, to audio headphone wire organizers.

BACKGROUND

The use of earphones and headphones is widespread. Such products are used to listen to music, to communicate through a telephone, to watch movies, to aid hearing-impaired individuals, and a multitude of other activities. The most common headphones and earphones used include a pair of ear-pieces and a pair of flexible wires extending between the ear-piece and the electronic device. Through continued use and transition between storage and operation, these wires oftentimes become tangled or broken to the point at which they are no longer operable or useful.

Accordingly, it can be seen that there exists a need for a better way for preserving the wires that extend between headphone and earphone ear-pieces and an electronic device to which they are secured. It is to the provision of solutions to this and other problems that the present invention is primarily directed.

SUMMARY

Generally described, the present invention relates to a device and method for accessorizing and organizing wires that are used in conjunction with audio equipment, for example ear-phones and headphones. The device has a hollow core and an elongated slit that is separable to receive the wires within the core. The device is also flexible.

In a first example embodiment, the invention relates to a method for protecting a length of flexible audio wire. The method includes providing at least one elongated hollow tube with a core and a resiliently-separable slit that provides access to the tube core. The tube is axially-flexible. The method also includes receiving the length of flexible audio wire within the hollow tube core through the resiliently-separable slit.

In another example embodiment, the invention relates to a sleeve for protecting a length of flexible audio wire. The sleeve includes an elongated hollow tube with a core, an opening at each end and a slit extending between the opening at each end. The slit includes a pair of opposing parallel edges that are resiliently separable.

In another example embodiment, the invention relates to a method for protecting a length of flexible audio wire. The method includes providing at least one elongated hollow tube with a core and a resiliently-separable slit providing access to the tube core. The tube includes material that is more rigid than the length of flexible audio wire and is axially-flexible in 360 degrees along a longitudinal axis. The method includes separating the slit to expose the hollow tube core and receiving the length of flexible audio wire within the tube core through the resiliently-separable slit.

The specific techniques and structures employed to improve over the drawbacks of the prior devices and accomplish the advantages described herein will become apparent from the following detailed description of example embodiments and the appended drawings and claims.

BRIEF DESCRIPTION OF THE DRAWINGS

FIG. 1 shows an embodiment of the wire-protectors according to a first example embodiment, in use with a set of ear phones.

FIG. 2 shows an enlarged and isolated view of the wire-protectors shown in FIG. 1.

DETAILED DESCRIPTION OF EXAMPLE EMBODIMENTS

Figure 5:
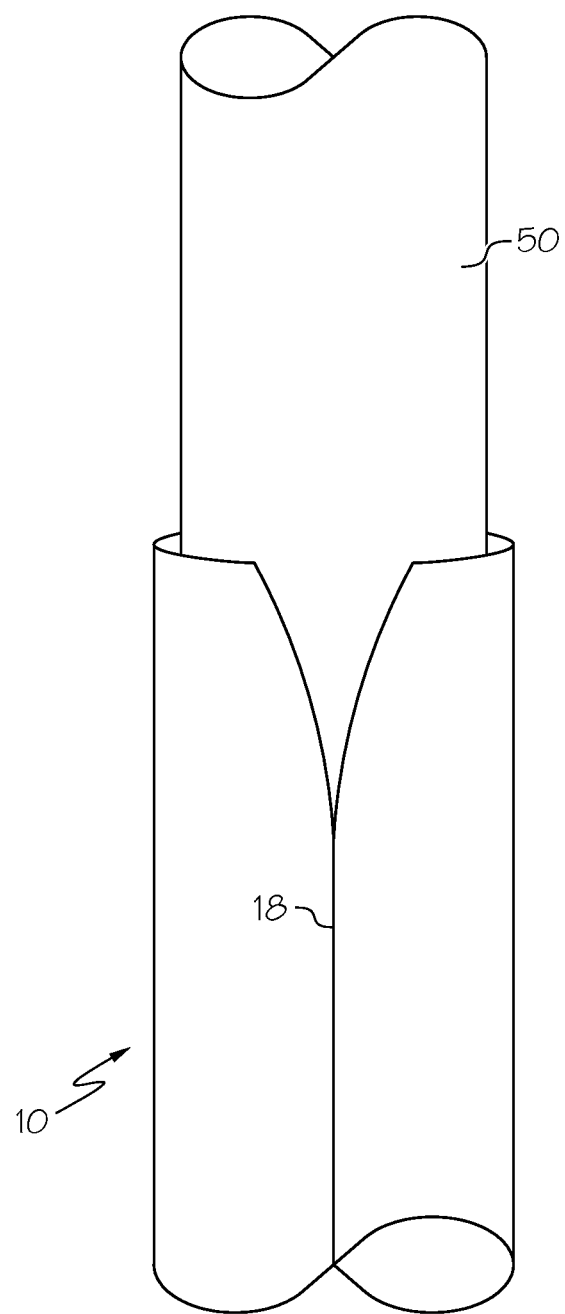
FIG. 5 shows an isolated and enlarged view of the wire-protector shown in FIG. 1, being inserted upon and surrounding a wire.

Generally described, the present invention relates to a device and method for accessorizing and organizing wires that are used in conjunction with audio equipment, for example ear-phones and headphones. As shown in FIG. 5, the device 10 includes an elongated tube-shape with a hollow interior core 20 and openings at each end. An elongated slit 18 extends the length of the tubing 10. The tubing 10 can be made of any durable and flexible material, for example plastic, more specifically polyurethane. The tubing 10 can alternatively be manufactured from PVC, rubber, vinyl, polypropylene, thermoplastics, silicone, any cloth material such as nylon, cotton, or like materials. The tubing 10 is configured to be flexible in 360 degrees along a longitudinal direction, and the tubing is designed to be less flexible than a common earphone or headphone wire. So, at rest the tubing 10 is configured to naturally return to an uncoiled or straightened state. Alternatively, the tubing 10 can be wrapped around an object, for example a cellular telephone or portable audio device. Because of these characteristics, the tubing 10 prevents the wires from becoming tangled during use or storage.

As shown in FIG. 2, the slit 18 is designed to close together in a relaxed state. So, at rest either elongated edge along the slit 18 will touch the opposite edge. The tubing is also flexible 360 degrees in an axial direction perpendicular to the length of the tubing. This allows a user to separate the edges of the slit 18 to widen the gap as shown in FIG. 5. As shown, the section of the slit 18 at the end of the tubing 10 can be pulled apart so that the wire 50 can be inserted within through the slit and into the interior core 20 of the tubing. Once the wire 50 is within the interior core 20 of the tubing 10, the tubing naturally compresses onto the wire and the width of the slit 18 narrows shut to close, or at least narrow, the gap.

Figure 3:
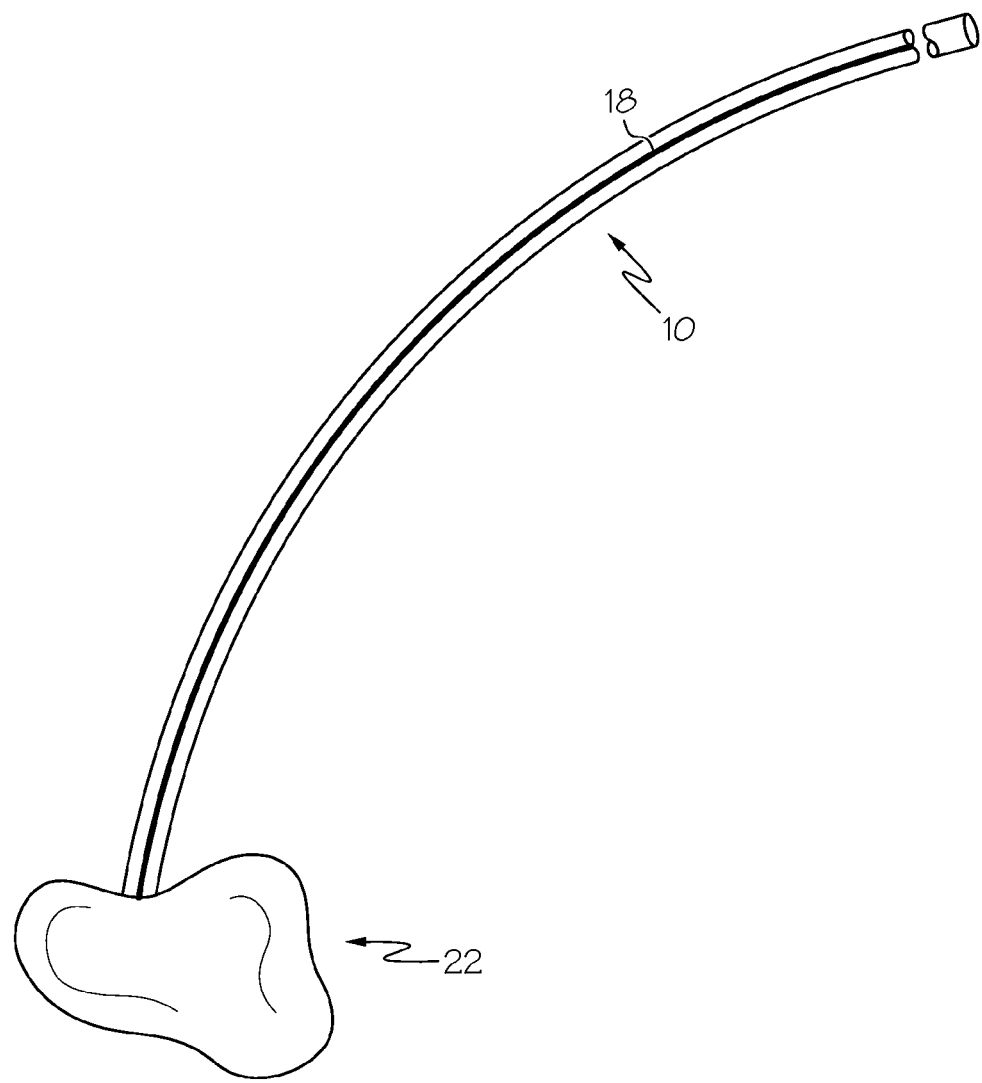
FIG. 3 shows the wire-protectors shown in FIG. 1, in use with an in-ear monitor.

Preferably, the tubing 10 is designed to fit snugly around the wire 50. Further, the dimensions of the tubing 10 can vary depending upon the wire it is designed to protect. For example, the tubing 10 can have a greater inner diameter in order to contain and snugly fit a thicker wire, and vice versa. Specifically, the interior surface of the tubing 10 can be designed to contact the outer surface of a corresponding earphone wire. Preferably throughout the length of the tubing 10, the distance between the inner diameter and the outer diameter remains constant. Alternatively, the oppositely-facing edges along the slit 18 can have a narrower thickness than the remaining sections of the tubing 10. Specifically, the edges can narrow to a tip. The length of the tubing 10 can also vary depending on the wire 50 it is secured to. Preferably, the tubing 10 is designed to cover and protect the entire length of a wire from the ear-piece 12, 22, 40 (as shown in FIGS. 1, 3 and 4).

Figure 4:
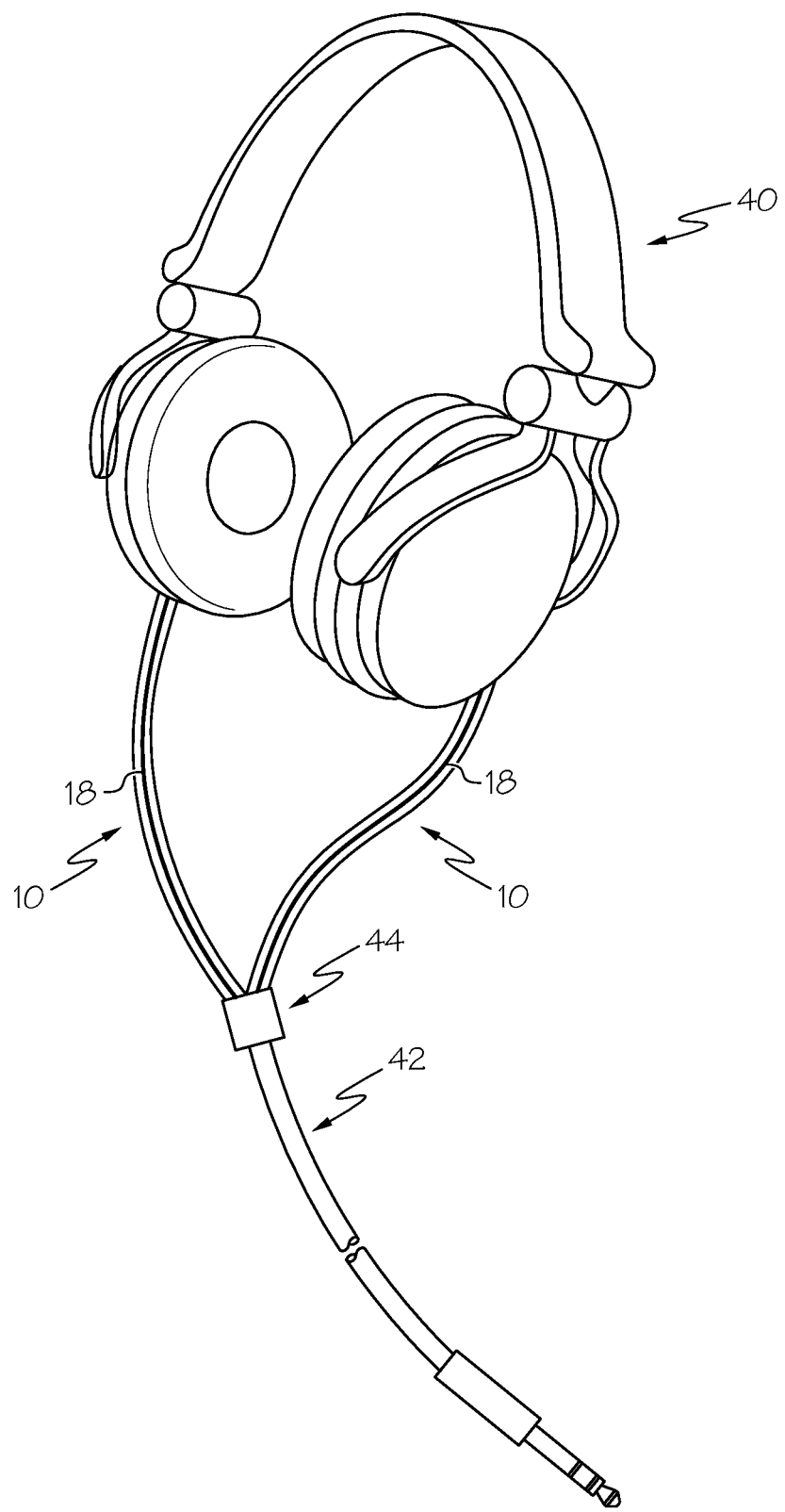
FIG. 4 shows the wire-protectors shown in FIG. 1, in use with a set of headphones.

In the examples shown in FIGS. 1 and 4 the tubing 10 is designed to protect most commercially-available earphone 12 and headphone 40 designs, which have two separate wires extending from the ear-piece and then joining into a connected cord 14, 42 beginning at a connector 16, 44. Preferably, the tubing 10 is designed to extend between the ear-piece 12, 40 and the connectors 16, 44. As shown, two tubes 10 are used in order to protect the wires of the head phones 40 and ear phones 12. Alternatively, a tube device could be designed to extend the entire length of a wire from the ear-piece to the input jack.

Alternatively still, the tubing 10 material can provide a visual accessory to the wires. For example the tubing 10 can be made of illuminescent, or glow-in-the-dark, material. The material can alternatively be a variety of colors or opaque shades. The cords could further have shiny or glittery exteriors.

It is to be understood that this invention is not limited to the specific devices, methods, conditions, or parameters described and/or shown herein, and that the terminology used herein is for the purpose of describing particular embodiments by way of example only. Thus, the terminology is intended to be broadly construed and is not intended to be limiting of the claimed invention. For example, as used in the specification including the appended claims, the singular forms "a," "an," and "one" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

While the invention has been shown and described in exemplary forms, it will be apparent to those skilled in the art that many modifications, additions, and deletions can be made therein without departing from the spirit and scope of the invention as defined by the following claims.

What is claimed is:

1. A method for preventing tangling of a length of flexible audio wire, the method comprising:
   providing at least one elongated hollow tube comprising a core and a resiliently-separable slit providing access from the exterior of the tube to the tube core, wherein the tube is axially-flexible, wherein the tube is made of a material that is more rigid than the flexible audio wire so that at rest the tube naturally uncoils or straightens the flexible audio wire, wherein the resiliently-separable slit extends along the entire length of the hollow tube and defines a pair of opposing parallel edges of the tube, wherein the pair of opposing parallel edges naturally close together at rest;
   separating the opposing parallel edges of the tube to open the slit and expose the core of the tube; and
   inserting the length of flexible audio wire into the hollow tube core through the resiliently-separable slit in order to prevent tangling of a the length of flexible audio wire.

2. A sleeve for preventing tangling of a length of flexible audio wire, the sleeve comprising:
   an elongated hollow tube comprising an opening at each end of the tube, a core extending along the entire length of the hollow tube between the two end openings and in communication with the two end openings, and a slit extending along the entire length of the hollow tube longitudinally between the two end openings and transversely all the way through the tube between the core and outside the tube, wherein the slit defines a pair of opposing parallel edges that are resiliently separable, wherein the slit has a relaxed state and a separated state, wherein the slit in the separated state is configured to provide access to insert the flexible audio wire between the pair of opposing parallel edges into the tube core, wherein the slit in the relaxed state naturally resists passage of the flexible audio wire between the pair of opposing parallel edges, and wherein the tube is made of a material that is more rigid than the flexible audio wire so that the tube naturally uncoils or straightens the flexible audio wire in order to prevent tangling of the length of flexible audio wire.

3. The method of claim 1, wherein the hollow tube is axially-flexible in 360 degrees along a longitudinal direction.

4. The sleeve of claim 2, wherein the tube is axially-flexible in 360 degrees along a longitudinal direction.

5. The sleeve of claim 2, wherein during the relaxed state, the pair of opposing parallel edges are configured to touch.

6. The sleeve of claim 2, wherein thickness of the tube, between the inner diameter and the outer diameter, is constant.

7. The sleeve of claim 2, wherein the thickness of the tube narrows toward the slit edges.

8. The sleeve of claim 2, wherein the flexible audio wire extends between an ear-piece and a wire connector, and wherein the tube extends substantially all the way between the ear-piece and the wire connector.

9. A kit including two of the sleeves of claim 8 for use with an audio-listening device including two of the flexible audio wires.

10. A sleeve for preventing tangling of a length of flexible audio wire, the sleeve comprising:
    an elongated hollow tube comprising a core and a resiliently-separable slit providing access from the exterior of the tube to the tube core, wherein the tube is axially flexible in 360 degrees along a longitudinal direction, wherein the tube is made of a material that is more rigid than the flexible audio wire so that at rest the tube naturally uncoils or straightens the flexible audio wire, wherein the resiliently-separable slit extends along the entire length of the hollow tube and defines a pair of opposing parallel edges of the tube, wherein the pair of opposing parallel edges close together at rest in order to prevent tangling of the length of flexible audio wire.

11. The sleeve of claim 10, wherein during the at-rest state, the pair of opposing parallel edges are configured to touch.

12. The sleeve of claim 10, wherein the thickness of the tube, between the inner diameter and outer diameter, is constant.

13. The sleeve of claim 10, wherein the thickness of the tube narrows toward the slit edges.

* * * * *